United States Patent Office 2,956,512
Patented Oct. 18, 1960

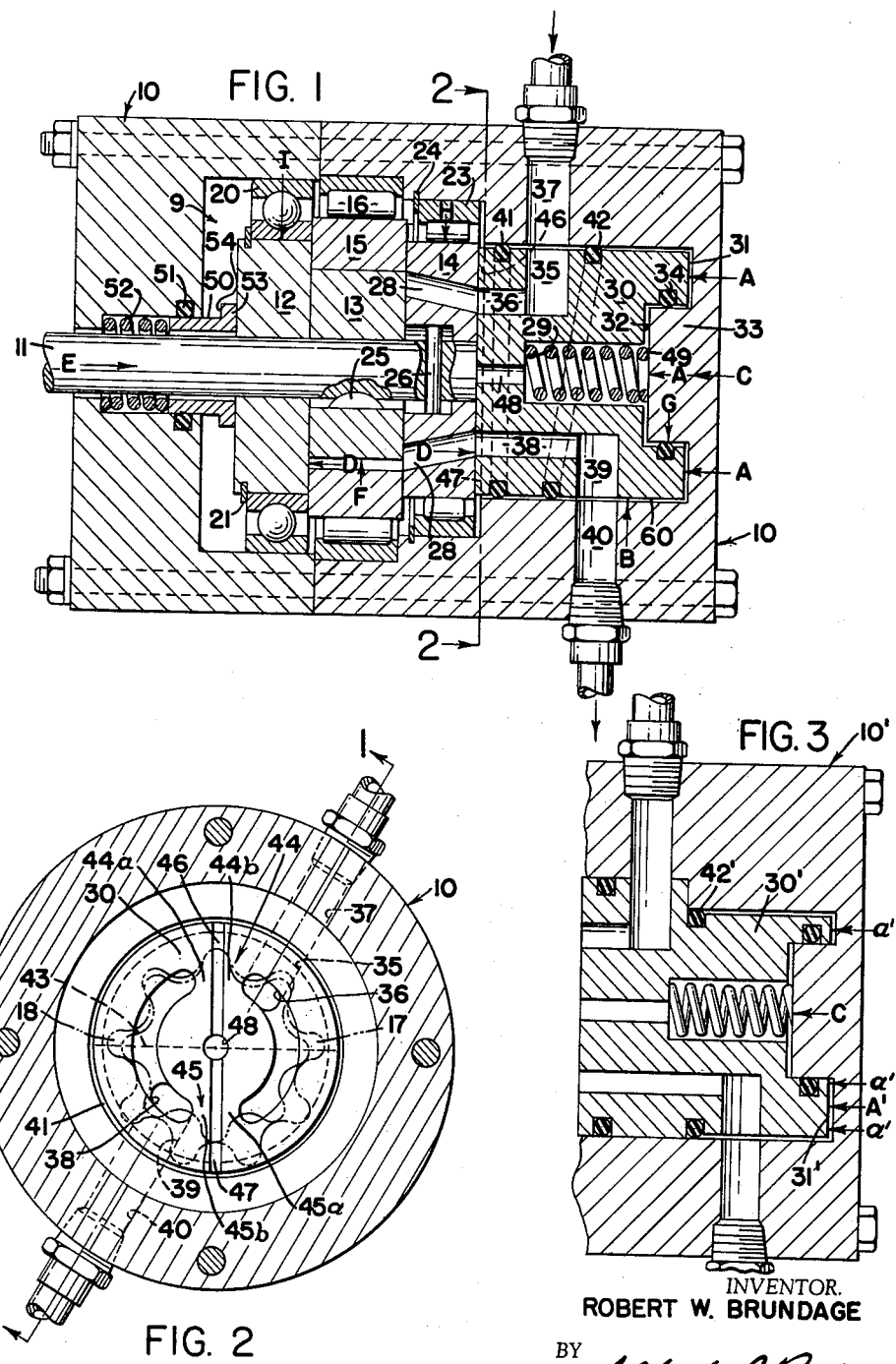

2,956,512

HYDRAULIC PUMP OR MOTOR

Robert W. Brundage, 37427 Harlow Drive, Lake County, Willoughby, Ohio

Filed May 2, 1957, Ser. No. 656,657

4 Claims. (Cl. 103—216)

This invention pertains to the art of hydraulic devices and, more particularly, to a hydraulic pump or hydraulic motor having improved means for balancing the hydraulic forces therein.

The invention is particularly applicable to a hydraulic pump of the eccentric or internal gear type and will be described with particular reference thereto, although it will be appreciated that the invention is equally applicable to internal gear type hydraulic motors, or to other types of pumps or motors having revolving or rotating chambers, such as, without limitation, pumps or motors of the vane or barrel-cylinder type. Obviously if the invention is employed on a motor, then discharge and inlet pressure as used herein will become inlet and exhaust pressure respectively. Obviously in a pump, inlet is at low and discharge is at high fluid pressures.

In internal gear type hydraulic pumps, meshed internal and external toothed gears rotate on spaced axes to define a plurality of revolving increasing and decreasing volume chambers which are closed at both axial ends by sealing surfaces each in sealing engagement with one axial end surface of the gears. Inlet and discharge passages may be provided either radially through the gears or axially through one or both sealing surfaces.

In any pump some, and normally one-half of the chambers, will contain hydraulic fluid at high discharge pressures, while the other half contain hydraulic fluid at a low, or negative pressure; the high pressures exert unbalanced hydraulic forces tending to separate the sealing surfaces.

One of the principal problems in pumps of the general type to which this invention pertains has been in establishing the proper clearances between the sealing surfaces and the sides of the gears under these forces. Thus, if the clearances in the pump are made sufficiently small so as to prevent leakage of fluid from the high pressure chambers, the clearances are then too small adjacent the low pressure chambers and excessive wear and friction result at this point. If the clearances in the pump are fixed clearances designed for the maximum pressure of operation, and if the pressure of operation is less than this maximum, the clearances are too low and friction over the entire surfaces of the gears will be excessive. If the clearances are designed for less than the maximum pressure, and the pressure then reaches the maximum amount, the clearances and leakage will be excessive.

It is known to form one of the sealing surfaces on an axially movable sealing member and provide an oppositely facing pressure surface on the member which is exposed to the high pressure. The sealing forces are thus proportional to these high pressures. However, the required sealing force is not proportional to the high pressure and if the discharge pressure rises substantially above the designed operating pressures, excessive sealing forces result with the possibility of the pump binding.

A further problem arises because of the unsymmetrical axial forces exerted by the high and low pressure fluids on the sealing surfaces. These forces exert a turning moment tending to warp or twist the sealing members relative to the axis of rotation resulting in excessive leakage adjacent the high pressure chambers and excessive surface pressures adjacent the low pressure chambers. The present invention also deals with this problem.

Thus in accordance with the present invention, axially slidable sealing means are provided between the sealing member and the housing to provide a cavity within the interior of the housing sealed from the remainder thereof and the sealing member has a radially facing pressure surface in spaced relationship to the housing surface and forming a surface of the cavity, the dimensions of this radially facing pressure surface being such that the high pressure exerts a radial force on the sealing member tending to move it radially and means provided a pivot engagement between the housing and the sealing member so located that the radial force exerts a turning moment on the sealing member opposite to the turning moment of the unsymmetrical axial forces.

The principal object of the invention is the provision of a new and improved rotatable chamber hydraulic pump or motor which is relatively simple in construction, has a minimum of internal leakages, a minimum of internal friction, is capable of pumping or being driven by relatively high hydraulic pressures and which has a high volumetric and mechanical efficiency.

Another object of the invention is the provision of a new and improved hydraulic pump or motor of the type described, having improved means for holding members in fluid sealed relationship.

Another object of the invention is the provision of a hydraulic pump or motor having a pressure loaded manifold plate having unsymmetrical radially facing surfaces exposed to the high pressures so that the unbalanced forces created thereby will offset other inherent unsymmetrical forces thereon.

Another object of the invention is the provision of a new and improved hydraulic pump or motor having improved means for balancing the hydraulic pressures therein.

Another object of the invention is the provision of a hydraulic pump having a manifold plate exposed to hydraulic pressures in such a manner that the unbalanced fluid forces on the plate are offset and balanced.

The invention may take physical form in certain parts, and arrangements of parts, a preferred embodiment of which will be described in detail in this specification and illustrated in the accompanying drawing, which is a part hereof and wherein:

Figure 1 is a side cross-sectional view taken on line 1—1 of Figure 2 of a hydraulic pump illustrating a preferred embodiment of the present invention;

Figure 2 is a cross-sectional view of Figure 1 taken approximately on the line 2—2 thereof; and, Figure 3 is a fragmentary view similar to Figure 1, but illustrating an alternative embodiment of the invention.

Referring now to the drawings wherein the showings are for the purposes of illustrating preferred embodiments of the invention only and not for the purposes of limiting same, Figures 1, 2, and 3 show a pump comprised of a housing 10 having a closed interior cavity 9 which as will appear is under a pressure intermediate the inlet and discharge pressures by virtue of leakage between the various surfaces from points of high pressure to points of lower pressure. This pressure will be referred to hereafter as the "leakage pressure." A drive shaft 11 extends into the cavity and has mounted thereon, from left to right, a sealing disc 12, an externally toothed gear 13, and a ported plate 14, all axially movable in the housing. An internally toothed gear 15 has one or more teeth than that of the externally toothed gear, and meshes therewith to define a plurality of increasing and decreasing volume chambers 17, 18.

The gear 15 is axially movable in and mounted for rotation in a roller bearing 16 positioned in a counterbore in the housing 10 having an axis eccentric to the axis of the shaft 11. This gear may be slightly longer than gear 13 so that members will wear in to a tight sealing fit with the disc 12.

The sealing disc 12 is supported for rotation in the housing in a roller bearing 20 which in the embodiment shown is fixed in the cavity of the housing. A snap ring 21 retains the roller bearing 20 in position on a sealing disc 12. The ported plate 14 is mounted and axially movable in a roller bearing 23 fixed in the housing by a snap ring 24. The axial spacing and location of the bearing 20, 23 are important and are further described and claimed in a co-pending application.

The sealing disc 12 and the gear 13 are preferably press fitted on the shaft 11 so that they act integrally therewith. The ported plate 14 is keyed to the shaft 11 for rotation, but is axially slidable therealong by means of the key 25 and of the pin 26.

The sealing disc 12 has a right hand surface in sealing engagement with the left hand surface of the gears 13, 15 while the left hand surface of the ported plate 14 is adapted to be in sealing engagement with the right hand surface of the gears 13, 15.

The ported plate 14 has a plurality of passages 28, one for each chamber 17, 18 through which hydraulic fluid may flow into and out of these chambers. As shown, these passages 28 slope outwardly and away from the direction of rotation when considered in a direction towards the chambers. These passages 28 will generally have a diameter equal to the maximum radial dimension of the chambers 17, 18. They may be circular or otherwise in cross-sectional shape.

It will thus be seen that the pump has a plurality of movable members defining a plurality of rotating increasing and decreasing volume chambers with one of the members having a sealing surface with passages leading from the chambers. If the ported plate 14 were omitted, the passage from the chambers would be in the right hand sealing surfaces of the gears 13, 15.

A manifold plate 30 has a left hand surface adapted to be in sealing engagement with the right hand surface of the ported plate 14 and an opposite outer pressure surface 31 and inner pressure surfaces 29, 32 separated by means of a boss 33 on the right hand end of the housing 10 extending into a recess in the right end of the manifold plate 30. An O-ring 34 in the wall of the recess sealingly engages the surface of the boss 33 to seal the surfaces 31, 32 one from the other.

The manifold plate 30 has an inlet manifold 36 extending axially therethrough for a short distance, then radially outwardly as at 35 where it communicates with a radial passage 37 in the housing 10. A hydraulic fitting is provided for communicating hydraulic fluid to the passage 37. In a like manner, the manifold plate has an outlet manifold 38 which extends axially for a greater distance than the inlet manifold 36 and terminates in a radially outwardly extending passage 39 which communicates with a radial passage 40 at the housing 10 further terminating in a hydraulic fitting as shown.

An O-ring 41 mounted in a groove in the outer surface of the manifold plate 30 to the left of the passage 35 seals the inlet passage from the interior of the pump housing. It will be noted that the plane of this O-ring is perpendicular to the axis of rotation. An O-ring 42 in a groove in the surface of the manifold plate 30 engages the inner walls of the housing 10 and seals the inlet passage 37 from the outlet or discharge passage 40. It will be noted that the plane of this O-ring is oblique to or at an angle other than perpendicular to the axis of rotation resulting in one portion of the O-ring being spaced a greater distance from the surface 31 than other portions of the O-ring. The point of maximum spacing corresponds to the mid-point 43 of the discharge manifold 38. The O-ring 42 thus forms an axially non-uniform radially facing surface 60 in the shape of a truncated cylinder with its maximum height through and symmetrical relative to the high pressure manifold. This surface 60 is exposed to the high pressure.

The inlet and outlet manifolds 36 and 38 are generally spaced radially from the axis of rotation a distance to correspond to the spacing of the right hand end of the passages 28 and as can be seen from Figure 2, are arcuate in shape.

The inlet and outlet manifolds are separated one from the other by means of a pair of lands 44, 45. The land 44 is in effect divided into two lands, 44a and 44b, by means of a trapping port 46 while the land 45 is in effect divided into a pair of auxiliary lands 45a and 45b by means of a trapping port 47. These trapping ports 46, 47 are intercommunicated with each other and with the leakage pressure. These trapping ports enable the use of wide lands without the dangers of trapping or cavitation. The trapping ports 46, 47 are also communicated with the pressure surface 32 by means of an axial passage 48. The passage has at its right hand end a counterbore in which a compression spring 49 is mounted bearing on the base of the counterbore and on the left hand face of the boss 33 to provide an initial force urging the manifold plate 30 to the left. The amount of force required of this spring 49, however, is relatively small.

The shaft 11 opening through the housing is pressure sealed by means of leakage pressure acting on a sleeve 50 surrounding the shaft 11 and engaging the left hand face of the sealing disc 12. An O-ring 51 mounted in the housing sealingly engages the outer surface of the ring.

The ring 50 has on its right hand end a radially outwardly extending flange 53 which provides a surface 54 exposed to the hydraulic leakage pressures on the inside of the housing 10. The radial dimension of the flange 53 is so proportioned that the sealing force created by pressure acting on the area determined by this radial dimension is substantially equal to the force created by the pressure gradient acting on the area of the sealing face cooperating with member 12. A spring 52 provides an initial sealing force. This shaft seal is described more fully and claimed in my co-pending applications.

In operation, the shaft 11 is rotated by means of an exterior power source, not shown. As the shaft 11 rotates, the sealing disc 12, the gears 13, 15 and the ported plate 14 also rotate. As the gears 13, 15 rotate, the chambers 17, 18 progressively increase and decrease in volume to suck fluid inwardly through other passages 28 and the outlet or discharge manifold 38. This discharge is usually at a high pressure.

Thus as the passages 28 rotate, each one will move, for example, from communication with the inlet manifold 36, past the auxiliary stop 45a into communication with the trapping port 47, past the auxiliary stop 45b and into communication with the discharge manifold 38. Subsequently, the passage will move past the auxiliary stop 44a, the trapping port 46, the auxiliary stop 44b, and again into communication with the inlet manifold 36. Each auxiliary stop, 45a, 45b and 44a, 44b, preferably has a width less than just the circumferential width of the passages 28. The total width of the two stops, however, is of course greater than the width of any one passage 28. This eliminates the danger of trapping, namely, where a chamber is decreasing in volume and it is impossible to discharge fluid therefrom even for an instant.

In operation there are pressure gradients between all of the sealing surfaces and leakage from the high pressure chambers to the interior cavity 9 which will tend to create an elevated pressure therein and leakage from this cavity 9 to the low pressure chambers. When the rate of flow to the cavity equals the rate of flow out of the cavity, this leakage pressure will become stabilized and is normally between one third and two thirds of the discharge pressure but normally closer to one half, the exact value depending upon the clearances and set-up of the various assembled parts. The effect of operating the interior of the pump cavity at the elevated pressure is to reduce leakage because the pressure gradient, for example, from one high pressure chamber to the interior is substantially reduced over that which would exist if the cavity 9 were operated at inlet pressure by leading it to the inlet passage.

The various hydraulic pressures in the pump exert a small force on each unit area of surface exposed to the pressure which small forces for the purposes of simplicity will be indicated by a single force in the form of a vector acting at the integrated center of locus or all of the small forces.

Obviously each force on each member of the pump must be opposed by an equal and opposite force which if offset or unaligned from its creating force results in a turning or twisting moment on the member. As will now appear, the present invention deals with so locating either the magnitude, the location or the spacing of the various forces that the turning moments of the hydraulic forces on any one member are in balance. Thus there is no tendency for the turning moments to twist one member relative to the other to create excessive clearances at one point and excessive sealing pressures at another point.

The hydraulic pressures in the pump chambers communicating with the outlet manifold 38 exert an axial force D on both the sealing disc 12 and manifold plate 30 which force is offset from the axis of the shaft 11. The force D on the disc 12 has an opposing force E which would normally be through the bearing 20. In accordance with the invention, some of this opposing force is created by the leakage pressure on the exposed left hand surface of the disc 12 radially outwardly of sleeve 50. The axial thrust on the bearings is thus lowered. These surfaces are symmetrical relative to the axis of the shaft 11 and the force E may be thus located on the shaft 11. These two forces being radially spaced create an off-center turning moment on the disc 12 which is transmitted to the shaft because of the interference fit of the disc 12 on the shaft.

The radial force F caused by hydraulic pressure on the gear 13 is transmitted to the shaft and is opposed by forces H and I acting through bearings 23 and 20 respectively. These forces are axially offset from the force F and create a bending moment on the shaft which counteracts the bending moment imparted by the forces D and E on the disc 12. The force F is proportional to the axial length of the gear 13. The axial spacing of the forces I and H are so proportioned by properly locating the bearings 20, 23 that the bending moments created by the forces D, E, F, H and I, will be equal and opposite and thus balanced. The disc 12 thus remains at firm and full sealing engagement with the ends of the gear 15.

The force D on the manifold plate 30 is opposed by force A resulting from the leakage pressures on the surfaces 29, 32 and the force C resulting from the discharge pressures on the surface 31. As these surfaces are symmetrical about the axis, the forces A and C are additive and may be located on the axis. As they are offset from the force D, however, they create a turning moment on the manifold plate in a counter-clockwise direction as viewed in Figure 1.

In accordance with the invention, other forces on the manifold plate 30 are so arranged as to exert an equal and opposite turning moment on the manifold plate 30. Thus the discharge pressures on the unsymmetrical side surfaces 60 of the manifold plate 30 result in a force B generally on the sides of the manifold plate 30 at the locus of the area i.e. in the plane 43 through the midpoint of the discharge manifold 38. This force B tends to move the manifold plate 30 upwardly as viewed in Figure 1 and is opposed by a force G between the lower surface of the boss 33 and the upper surface of the recess in the manifold plate 30. In effect the boss 33 and counterbore surfaces form opposed radially facing surfaces between the line of action of force B and the end of the manifold plate 30 remote from its sealing surface. The force G will generally be located approximately midway along the length of the boss 33 and through the O-ring 34. The force B will have a magnitude depending both upon the discharge pressure and the amount of eccentricity of the ring 42. The axial position of the force B relative to the force G will be determined by the axial position of the ring 42. In accordance with the invention the axial position of the ring 42 and its eccentricity are all proportioned so that the turning moment created by the forces B and G will be equal and opposite to the turning moment of the forces A plus C and D. Thus the manifold plate 30 is in complete hydraulic balance and there is no tendency for its sealing surface to separate from the adjacent surface of the ported disc 14 adjacent the discharge manifold 38 or to have insufficient clearance or excessive pressures adjacent the inlet manifolds 36.

It is believed that the success of this feature is based on the discovery that the force D tending to separate the surfaces is not directly proportional to the high pressures but is a factor something under unity.

If a pump is over sealed, insufficient leakage from the discharge to enclosed chamber 9 on the inside of the housing will take place, causing excessive friction and wear on the rubbing surfaces. Under this condition, the pressure in chamber 9 drops reducing the force on faces 32 and 39, and hence reducing the pressure sealing load to a point where insufficient leakage will take place for lubrication purposes. Conversely, if the pump is under sealed and too much discharge fluid escapes into chamber 9, the pressure in chamber 9 goes up increasing the forces on faces 32 and 39 to the point where adequate sealing will take place. As can be seen, the resulting sealing force on the members is not proportional to discharge pressure, but to sealing needs. This is desirable in that, regardless of fit, alignments and operating conditions, the pump is always sealed for its optimum performance. Theoretically, for optimum performance, a pump or motor of the types applicable should be pressure sealed entirely from force generated by pressure leaked into an enclosed area. However, since ideally this pressure is exactly ½ discharge pressure, the areas required for this pressure to act upon may be unduly large. Hence in most cases a compromise is dictated whereby discharge pressure supplies a portion of the required pressure sealing force.

It is also believed that I am the first to have provided an arrangement for balancing the unsymmetrical forces on the manifold plate so that no tendency for the plate to twist in the housing will result and uniform forces can be obtained over the entire sealing surfaces.

In the embodiment of Figure 1, the effect of the unsymmetrical force on the manifold plate 30 is reduced or compensated for by forming the plane of the O-ring 42 at an oblique angle to the axis of rotation. Figure 3 shows an alternative arrangement for producing such an arrangement. In Figure 3, the manifold plate 30' has a boss on its right hand end with an axis eccentric to the axis of rotation providing a surface 31' also unsymmetrical to the axis of rotation. An O-ring 42' is disposed in a groove perpendicular to the axis of rotation on the boss generally as is shown. The hydraulic fluid on the surface 31' exerts a force A'. This force A' plus the force C will exactly offset the force D tending to separate the surfaces. It will be noted that the housing 10' also has an offset recessed to receive the offset boss on the manifold plate 30'.

It will be appreciated that the present invention is not limited to the use of eccentric or internal gearing. The chambers 17, 18 could as well be defined by the vanes of a vane type pump or the pistons and rotating cylinder of a barrel type pump, although in the latter case, the sealing disc 12 would not be required.

It will also be appreciated that means can be provided externally of the pump for rotating the manifold plate 30 in the housing 10 to circumferential positions other than that shown in the figures. By so rotating the manifold plate 30, the output of the pump can be varied at will from zero to a maximum. When such rotation of the manifold plate takes place, the trapping ports 46, 47 then become particularly of value, because hydraulic fluid from a decreasing volume chamber as it passes one of the stops, is communicated through the trapping ports to the corresponding opposite increasing volume chamber and the energy thereof is recovered. This is described and claimed in my co-pending application, Serial No. 548,022, filed November 21, 1955.

The O-rings employed for sealing purposes are of rubber or other like material, having a low modulus of elasticity as compared to metals, and may thus be considered pliable. As can be seen from the drawings, the surfaces of the manifold member 30 are radially spaced from the inwardly facing surfaces of the housing 10, and the sealing rings actually support and position the manifold member as shown. With such a construction, manufacturing tolerances may be greatly increased with a consequent saving in the cost of manufacturing. Furthermore, the pliant sealing rings enable the manifold member to move slightly in the housing cavity in response to external forces thereon so that the left hand sealing surface can always be in firm sealing engagement with the right hand sealing surface of the ported disc 14. Obviously, other shapes of sealing rings may be employed.

It will thus be seen that embodiments of the invention have been described wherein a member having a sealing surface having a radially offset axial force thereon may be placed in complete hydraulic balance by providing other surfaces on the member exposed to the high pressure which are so positioned and dimensioned as to create the necessary hydraulic forces which will offset the radially offset axial force. The prime requirement is that all of the surfaces of the manifold member other than its sealing surface exposed to the high pressures be so oriented that the resultant of all of the hydraulic forces on the sealing member are equal to zero.

The invention has been shown as applied to a member having manifold openings therein. Obviously, manifold openings could be otherwise provided in the device. The force balancing is applicable to axially moving sealing members whether or not they have manifold openings therein. Also, it is not necessary that the sealing ring be all located in a common plane, the prime requirement being that they define a localized area exposed to the high pressures which will exert the desired hydraulic force so that the vector sum of all of the forces on the member other than the force D will be equal opposite and aligned with the force D.

As heretofore indicated, the invention is equally applicable on hydraulic motors in which case the discharge or high pressure manifold becomes the inlet or high pressure manifold and the inlet or low pressure manifold becomes the low pressure or outlet manifold.

The invention has been described with particular reference to a preferred embodiment. Obviously, modifications and alterations will occur to others upon reading and understanding of this specification, and it is my intention to include all such modifications and alterations insofar as they come within the scope of the appended claims.

Having thus described my invention, I claim:

1. In a hydraulic device comprised of: a housing having a radially-inwardly-facing surface defining a hollow interior, a plurality of members relatively movable in said interior and defining a plurality of axially-open-ended chambers which revolve on a fixed-closed path of movement, said chambers gradually increasing in volume after they pass a fixed point of minimum volume on said path of movement until they reach a fixed point of maximum volume on said path of movement and then gradually decreasing in volume until they reach said point of minimum volume, generally one half of said chambers being at high fluid pressure and generally the other half being at low fluid pressure, the members having axially facing sealing surfaces with each chamber having an opening through said surfaces, a sealing plate axially movable relative to said members and said housing and having a sealing surface in sealing engagement with the member-sealing surfaces to close one axial end of said chambers, said high pressure exerting a radially-offset axial force on said sealing plate, means exerting an opposing coaxial force on said plate, said forces exerting a turning moment on said plate tending to separate said sealing surfaces adjacent said high pressure chambers, the improvement which comprises: axially slidable sealing means between said sealing plate and said housing providing a cavity within the interior of said housing sealed from the remainder thereof, said sealing plate having a radially-facing pressure surface in spaced relationship to said housing surface and forming a surface of said cavity, means communicating said high pressures to said cavity, the axial length of said sealing-plate-radially facing surface varying in a circumferential direction to provide an area on one radial side of said plate exposed to said high pressures greater than the area on the diametrically opposite side of said plate exposed to said high pressures whereby said high pressure exerts a radial force on said sealing plate tending to move the plate radially and means providing a pivoted engagement between said housing and said sealing plate so located relative to the line of action of said radial force that said radial force exerts a turning moment on said sealing plate opposite to the turning moment of said radially offset axial force on said sealing plate.

2. The improvement of claim 1 wherein said sealing means between said sealing-plate and housing is a generally circumferentially extending O-ring defining a plane having an oblique angle to the axis of said device.

3. The improvement of claim 2 wherein the obliqueness of said plane is toward said high-pressure chambers and away from said low-pressure chambers whereby the area of the radially-facing surface on said sealing plate exposed to said high pressures is on the same side of the axis as the high-pressure chambers and the point of engagement between said sealing plate and said housing is on the side of the line of action of said radial force remote from said sealing surface.

4. The improvement of claim 3 wherein the obliqueness of the angle of the plane of said O-ring and the spacing of the point of engagement between said sealing plate and said housing are so proportioned that the turning moment created by said radial force about said point of engagement is generally equal and opposite to the turning moment of the radially-offset axial force.

References Cited in the file of this patent

UNITED STATES PATENTS

| | | |
|---|---|---|
| 1,780,109 | Berglund | Oct. 28, 1930 |
| 2,044,873 | Beust | June 23, 1936 |
| 2,490,115 | Clarke | Dec. 6, 1949 |
| 2,649,740 | Murray et al. | Aug. 25, 1953 |
| 2,682,836 | Orr | July 6, 1954 |
| 2,695,566 | Compton | Mar. 30, 1954 |
| 2,702,509 | Garnier | Feb. 22, 1955 |
| 2,714,856 | Kane | Aug. 9, 1955 |
| 2,728,301 | Linberg | Dec. 27, 1955 |
| 2,742,862 | Banker | Apr. 24, 1956 |
| 2,745,356 | Lauck | May 15, 1956 |

(Other references on following page)

UNITED STATES PATENTS

| | | |
|---|---|---|
| 2,756,681 | Oliver | July 31, 1956 |
| 2,782,724 | Humphreys | Feb. 26, 1957 |
| 2,792,788 | Eames | May 21, 1957 |
| 2,804,827 | Rydberg | Sept. 3, 1957 |
| 2,808,785 | Hilton | Oct. 8, 1957 |
| 2,809,592 | Miller et al. | Oct. 15, 1957 |
| 2,816,510 | Jarvis | Dec. 17, 1957 |
| 2,816,512 | Murray | Dec. 17, 1957 |
| 2,823,615 | Haberland | Feb. 18, 1958 |
| 2,824,522 | Compton | Feb. 25, 1958 |
| 2,824,523 | Campbell et al. | Feb. 25, 1958 |
| 2,824,524 | Banker | Feb. 25, 1958 |
| 2,842,066 | Hilton | July 8, 1958 |
| 2,853,952 | Aspelin | Sept. 30, 1958 |
| 2,855,855 | Murray et al. | Oct. 14, 1958 |

FOREIGN PATENTS

| | | |
|---|---|---|
| 661,652 | Great Britain | July 16, 1947 |